United States Patent [19]
Galitsky

[11] 3,924,611
[45] Dec. 9, 1975

[54] SPIROMETER AND ANENOMETER APPARATUS

[76] Inventor: Jury Petrovich Galitsky, ulitsa Kirova 13, kv. 31, Moscow, U.S.S.R.

[22] Filed: May 10, 1974

[21] Appl. No.: 469,028

Related U.S. Application Data

[63] Continuation of Ser. No. 348,627, April 6, 1973, abandoned.

[52] U.S. Cl. ............ 128/2.08; 73/230; 128/DIG. 29
[51] Int. Cl.² ............................................ A61B 5/08
[58] Field of Search......... 128/2.08, 2.07; 73/230 R, 73/231 R

[56] References Cited
UNITED STATES PATENTS

| | | | |
|---|---|---|---|
| 173,693 | 2/1876 | Tylor | 73/230 X |
| 820,259 | 5/1906 | Renvoize | 73/231 R |
| 2,098,280 | 11/1937 | Dornseif | 128/2.08 |
| 2,326,925 | 8/1943 | Bortini | 128/2.08 |
| 2,427,145 | 9/1947 | Koehler et al. | 128/2.08 |
| 2,837,083 | 6/1958 | Lanooy | 128/2.08 |
| 3,566,387 | 2/1971 | Schoener et al. | 128/2.08 |

*Primary Examiner*—Kyle L. Howell
*Attorney, Agent, or Firm*—Holman & Stern

[57] ABSTRACT

A spirometer and anemometer apparatus provided with a first chamber for measuring the respiratory rate in communication with a second chamber for measuring the volumes of consumed air. The chamber for measuring the respiratory rate has an inlet opening, an inspiratory valve and an aneroid meter operably connected to an indicating or registering instrument. The chamber for measuring the volume of consumed air has an expiratory valve, an additional or second inspiratory valve and an impeller which is operably connected to an indicating or registering instrument. Mounted in the inlet opening of the chamber for measuring the respiratory rate is an air intake means communicating with an air draw-off pipe, the outlet end of the pipe faces the impeller so that an air jet provided from the air draw-off pipe damps the impeller.

4 Claims, 2 Drawing Figures

SPIROMETER AND ANENOMETER APPARATUS

This is a continuation, of application Ser. No. 348,627, filed Apr. 6, 1973 now abandoned.

BACKGROUND OF THE INVENTION

The invention relates generally to medical engineering and more particularly, it relates to a spirometer and anemometer apparatus to be used in studying the respiratory metabolism in a human being by measuring the respiratory rate and the volume of the expirated air.

The apparatus according to the invention may find application in determining the energy consumption of a human being for respiratory metabolism in various fields, such as in medicine, sports, aviation, mountain exploratory missions and the like.

PRIOR ART

A spirometer and anemometer apparatus known in the art comprises a chamber for measuring the respiratory rate having an inlet opening, an inspiratory valve and an aneroid respiratory rate meter which is operably connected to an indicating instrument, as well as a chamber for measuring the volume of consumed air communicating with the first-mentioned chamber and having an outlet opening, with the output of the chamber for measuring the respiratory rate being in communication with the input of the chamber for measuring the volume of consumed air by means of an expiratory valve. The chamber for measuring the volume of consumed air accommodates an impeller disposed behind the expiratory valve and rotatable under the action of air provided from the chamber for measuring the respiratory rate. The impeller is operably connected to an indicating instrument.

During inspiration by a test subject, air flows into the lungs of the test subject through the inspiratory valve disposed in the housing of the chamber for measuring the respiratory rate and through the inlet opening of this chamber, while during expiration, the air flows through the inlet opening into the chamber for measuring the respiratory rate and then, after having caused the opening of the expiratory valve, the air flows into the chamber for measuring the volume of consumed air to rotate the impeller located therein. The air is discharged from the chamber for measuring the volume of consumed air through an outlet opening, and if necessary, a bag can be attached to the outlet opening for air sampling.

Reduced and gauge pressure is established in the chamber for measuring the respiratory rate during the inspiration and expiration respectively due a restriction in the inspiratory valve, and the aneroid meter accommodated in this chamber and connected to the indicating instrument provides for a counting of the respiratory rate. The volume of consumed air is measured by means of the indicating instrument connected to the impeller.

However, the known spirometer and anemometer apparatus exhibits a rather high inertia of the impeller and thereby a low accuracy of measurement over a broad range of changes in the volume of consumed air. Thus, with a change in the volume of consumed air over a limited measuring range from 7.5 to 25 liters per minute an error in measurement by means of the known spirometer and anemometer apparatus is up to 20% and greater which constitutes an important disadvantage of this apparatus.

The utilization of mechanical devices in order to eliminate the inertia of the impeller, such as damping devices, is rather ineffective since it provides only for an elimination of the inertia over narrow measuring ranges and greatly reduces the accuracy of the measurements.

OBJECT AND SUMMARY OF THE INVENTION

It is an object of the invention to improve the accuracy of measurement of a spirometer and anemometer apparatus over a broad range of changes in the volume of consumed air.

This object is accomplished by the provision of a spirometer and anemometer apparatus comprising a first chamber for measuring the respiratory rate having an inlet opening, an inspiratory valve and an aneroid respiratory rate meter operably connected to an indicating or registering instrument, and a record chamber for measuring the volume of consumed air having an impeller rotatable under the action of air provided from the chamber for measuring the respiratory rate and operably connected to an indicating or registering instrument and an outlet opening, together with an expiratory valve, according to the invention, the expiratory valve is mounted in the outlet opening of the chamber for measuring the volume of consumed air which is provided with an additional inspiratory valve, while in the inlet opening of the first chamber for measuring the respiratory rate, there is mounted an air intake means in communication with the second chamber for measuring the volume of consumed air by means of an air draw off pipe, and the outlet end of the pipe directly faces the impeller so that an air jet provided from the air draw-off pipe exerts a damping action upon the impeller.

The additional inspiratory valve is preferably provided with an adjusting iris diaphragm. The air draw-off pipe is preferably provided with an adjusting throttle.

The spirometer and anemometer apparatus according to the invention ensures an improved accuracy of measurement due to the constant control of the impeller rotational speed depending upon the air flow rate by feeding into the impeller blades a damping air jet through the air intake means during expiration and through the additional inspiratory valve during inspiration. Full stoppage of the impeller by the instant of expiration may be achieved by means of the adjusting iris diaphragm mounted in the additional inspiratory valve which also contributes to an improvement in the accuracy of measurement. Error in measurement by means of the spirometer and anemometer apparatus according to the invention is less than 10% over the range of changes in the volume of consumed air from 5 to 35 liters per minute.

The invention will now be described with reference to the specific embodiment thereof illustrated in the accompanying drawings, in which:

DETAILED DESCRIPTION OF THE PREFERRED EMBODIMENT

Figure 1:
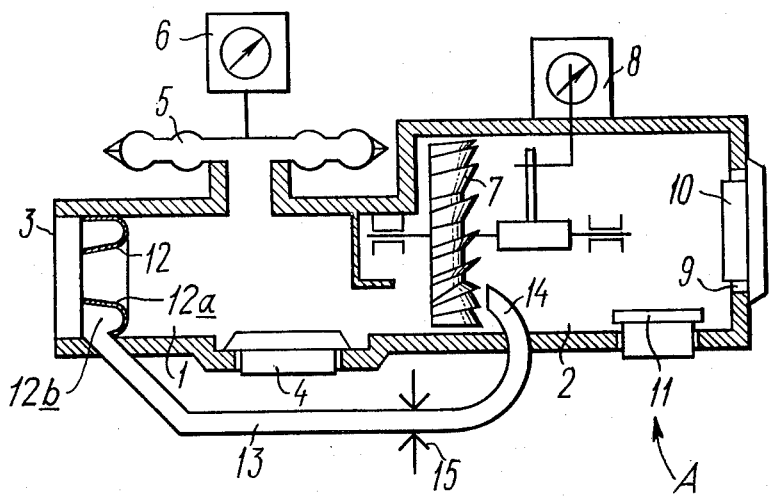
FIG. 1 schematically shows a general view of a spirometer and anemometer apparatus according to the invention partly in longitudinal section and partly in elevation and FIG. 2 is a view of an additional or second inspiratory valve taken in the direction of the arrow A in FIG. 1.

The spirometer and anemometer apparatus comprises a first chamber 1 (FIG. 1) for measuring the respiratory rate and a second chamber 2 communicating therewith and adapted to measure the volume of consumed air. The chamber 1 is provided with an inlet opening 3, an inspiratory valve 4 disposed at approximately right angles to the opening 3 and an aneroid respiratory rate meter 5. The aneroid rate meter 5 is connected to an indicating or registering instrument 6 by means of any known transmission, such as by means of a linkage with a ratchet wheel (not shown).

The second chamber 2 for measuring the volume of consumed air accommodates an impeller 7 operably connected to an indicating or registering instrument 8. The operative connection of the impeller 7 with the indicating instrument 8 may be established by any known method, e.g. by means of a worm gearing and a reduction gear (not shown in the drawings). An expiratory valve 10 is mounted in an outlet opening 9 of the chamber 2. The chamber 2 also accommodates an additional or second inspiratory valve 11 located at substantially right angles to the outlet opening 9.

To measure the volume of consumed air, there is employed an old pointer indicating or registering instrument having two scales, with one of the scales being graduated in millimeters and the other in liters. Attention is called to Utyamyshev R. I., "Radio electronic Apparatus for Studying Physiological Processes", Energiya Publishers, Moscow, 1969, pp. 70–73 or Inventors Certificate No. 182852.

Mounted in the inlet opening 3 is an air intake means 12 which is in communication with the second chamber 2 by means of an air draw-off pipe 13. More specifically the air intake means 12 includes a central opening 12a leading to the first chamber 1 and a duct 12b surrounding the opening 12a and with which the draw-off pipe 13 communicates. An end 14 of the air draw-off pipe 13 directly faces the impeller 7 so that an air jet provided therefrom exerts a damping action upon the impeller which is rotated under the action of an air jet flowing into the chamber 2 from the chamber 1.

Mounted in the air draw-off pipe 13 is an adjusting throttle 15 which makes it possible to change the cross-sectional area of the air draw-off pipe 13 during the adjustment of the spirometer and anemometer apparatus by adjusting the ratio between the cross sectional areas of the air draw-off pipe 13 and the inlet opening 3 so as to obtain a maximum accuracy of measurements.

Figure 2:
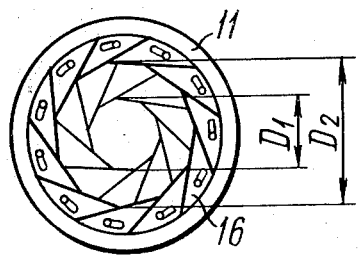

The additional or second inspiratory valve 11 is provided with an adjusting iris diaphragm 16 (FIG. 2) which ensures obtaining an air jet from the additional inspiratory valve 11 by adjusting the diameter of the opening of the additional inspiratory valve 11 from $D_1$ to $D_2$, with the force of the jet being such as to achieve a full stoppage of the impeller 7 (FIG.1) by the instant of expiration.

A bag for air sampling (not shown) may be attached to the outlet opening 9 of the chamber 2.

The spirometer and anemometer apparatus according to the invention functions as follows During inspiration, air flows through the valve 4 into the first chamber 1 and through the valve 11 into the second chamber 2 and then through central opening 12a of the air intake means through the inlet opening 3 into the lungs of a test subject. At this stage, the valve 10 of the second chamber 2 is closed. Reduced pressure is established in the first and second chambers 1 and 2 due to the restriction in the valve 4 and the valve 11 and the housing of the aneroid rate meter 5 is contracted.

During expiration, the air flows through the inlet opening 3, the central opening 12a of the air intake means 12 into the first chamber 1 and from the first chamber 1 into the second chamber 2 to rotate or impart circular motions to the impeller 7 in the second chamber 2. The number of revolutions of the impeller 7 is registered by the instrument 8 which is graduated in the units of the volume of consumed air. The valves 4 and 11 remain closed during expiration. The air is discharged from the second chamber 2 via the valve 10. During this stage, a gauge pressure is established in the first and second chambers 1 and 2 due to the restriction in the valve 10, whereby the housing of a aneroid rate meter is inflated to actuate the meter 6 thus counting the respiratory rate. Then, the above cycle is repeated.

During operation, the damping action of the air jet is imposed upon the impeller 7. During inspiration, the air jet is directed to the impeller from the second inspiratory valve 11, with the force of the jet being adjusted during the adjustment of the apparatus by the iris diaphragm 16 so as to achieve the stoppage of the impeller 7 by the beginning of the expiration. The impeller stops completely between two successive inhalations under the effect of the air inhaled, as a result of which the apparatus can measure with high accuracy the volume of one exhalation.

During expiration, the damping air jet is directed to the impeller 7 via the duct 12b of the air intake means 12, the draw-off pipe 13 and the end 14 of such pipe thus ensuring the control of the rotational speed of the impeller 7 dependent upon the flow rate of the air entering the inlet opening 3 from the test subject. This damping of the impeller 7 improves considerably the measurement accuracy over a broad measuring range as compared to the known apparatus.

During inhalation, air is admitted via the valve 4 into the chamber 1 and via the additional or second valve 11 into the chamber 2, from whence it flows through the impeller 7 thus applying a braking action thereon suchwise that the impeller stops completely before the first stage of exhalation begins. Then, air flows into the patient's lungs. The valve 11 is provided with the iris diaphragm 16 which assists in adjusting the apparatus by controlling the braking airstream passing, during inhalation, through the valve 11 by varying the diameters $D_1$ and $D_2$.

During exhalation, the airstream flows through the inlet opening 3 into the chamber 1 and then to the chamber 2 thereby effecting rotation of the impeller 7. In addition, an airstream is directed simultaneously through the air intake means 12 into the air take-off pipe 13 and through end 14 thereof is directed onto the impeller 7 to apply a braking action thereon. Then, the airstream is exhausted through the valve 10 provided in the outlet of the chamber 2.

In the course of exhalation, the number of revolutions of the impeller 7 is indicated on the instrument 8 which is graduated in units of the volume of consumed air.

As above mentioned, air is discharged from the chamber 2 via the valve 10 and during the stage, a gauge pressure is established in the chambers 1 and 2 so that the casing of the aneroid rate meter 5 is inflated for actuating the instrument 6 thereby counting the respiratory rate.

The air is discharged from the chamber 2 through the expiratory valve 10.

During this stage, a gauge pressure is established in the chambers 1 and 2 due to the restriction in the expiratory valve 10, whereby the housing of the aneroid meter is inflated to actuate the indicating meter 6 thereby counting the respiratory rate. Then the above-described cycle is repeated.

What is claimed is:

1. A spirometer and anenometer apparatus comprising wall means providing a first chamber for measuring the respiratory rate; said first chamber having an inlet opening in its wall means and an opening providing communication between the first chamber and the atmosphere; an inspiratory valve accommodated in said opening providing communication between said first chamber and the atmosphere; an aneroid respiratory rate meter in movable connection with said first chamber; a registering instrument in movable connection with said aneroid respiratory rate meter; wall means providinig a second chamber for measuring the volume of consumed air; means providing communication between said first and second chambers; said second chamber having an outlet opening in its wall means and an opening providing communication between said second chamber and the atmosphere; an expiratory valve mounted in said outlet opening; a second inspiratory valve mounted in said opening providing communication between said second chamber and the atmosphere; a rotatable impeller mounted in said chamber so that it faces said means providing communication between said first and second chambers and rotated by an air jet flowing from said chamber to said second chamber through said means providing communication between said first and second chambers; a second registering instrument in movable connection with said impeller to register circular motions of said impeller during exhalation; means mounted in said inlet opening of said first chamber, said means including a central opening for admitting a portion of the air coming to said inlet opening into said first chamber and a duct surrounding said central opening; and a draw-off pipe having first and second ends; said first end being connected with said duct and said second end turned to said impeller so that the air jet passing from said second end exerts a damping action upon said impeller.

2. The spirometer and anemometer apparatus according to claim 1, wherein said second inspiratory valve is provided with an adjusting iris diaphragm.

3. The spirometer and anemometer apparatus according to claim 1 wherein said air draw off pipe is provided with an adjusting throttle.

4. The spirometer and anemometer apparatus according to claim 2, wherein said air draw-off pipe is provided with an adjusting throttle.

* * * * *